United States Patent [19]
Bljumberg et al.

[11] 3,821,259
[45] June 28, 1974

[54] METHOD OF SIMULTANEOUS PRODUCTION OF OLEFINE OXIDES AND ACETIC ACID

[76] Inventors: Erna Albertovna Bljumberg, Leninsky prospekt, 57, kv.10; Demid Vasilievich Ivanjukov, Karmanitsky pereulok, 10, kv. 4; Sergei Alexeevich Maslov, Smolensky bulvar, 14/22, kv. 9; Jury Dmitrievich Norikov, prospekt Vernadskogo, 113, kv. 91; Nikolai Markovich Emanuel, Vorobieuskoe, shosse 2 "b", kv. 44; Vladimir Vasilievich Boiko, Kaptonya, 1 kvartal, dom 12, kv. 2, all of Moscow, U.S.S.R.

[22] Filed: May 26, 1972

[21] Appl. No.: 257,349

[52] U.S. Cl. .......................................... 260/348.5 V
[51] Int. Cl. ............................................. C07d 1/08
[58] Field of Search ............................. 260/348.5 V

[56] References Cited
FOREIGN PATENTS OR APPLICATIONS

| | | | |
|---|---|---|---|
| 1,376,471 | 9/1964 | France ........................ | 260/348.5 V |
| 1,057,398 | 2/1967 | Great Britain ............... | 260/348.5 V |
| 1,080,462 | 8/1967 | Great Britain ............... | 260/348.5 V |
| 1,143,577 | 2/1969 | Great Britain ............... | 260/348.5 V |

OTHER PUBLICATIONS

Malinovskii, M. S., Epoxides and Their Derivatives, (1965), pp. 64, 65, 68.

*Primary Examiner*—Norma S. Milestone
*Attorney, Agent, or Firm*—Eric H. Waters

[57] ABSTRACT

A method for the simultaneous production of olefin oxides and acetic acid consisting in concurrent oxidation of olefins and acetaldehyde with an oxygen-containing gas in the presence of a catalyst in the form of a silver compound or vanadium oxides.

3 Claims, No Drawings

METHOD OF SIMULTANEOUS PRODUCTION OF OLEFINE OXIDES AND ACETIC ACID

The present invention relates to a method for simultaneous production of olefin oxides and acetic acid. Olefin oxides, particularly ethylene and propylene oxides are important products of organic synthesis and they are widely used in the chemical industry. Olefin oxides are employed for producing polyurethane, glycols, polyglycols and their esters, capillary active substances, antifreeze compounds, lubricating oils, plasticizers, humidifiers, and other products. Acetic acid and acetoacetates are used as solvents in manufacture of artificial fibre, synthetic dyes, acetone; they are also used in the food industry and as an initial material for producing acetone.

At present, there are no industrial methods of producing propylene oxide without the application of chlorine. In the known industrial process of producing propylene oxide 1 ton of propylene oxide is obtained by consuming about 3 tons of chlorine and alkali. The reaction is effected in two stages: (1) production of propylene chloro-hydrine and (2) its saponification with alkali to propylene oxide. The chief disadvantage of this method consists in the formation of a huge amount of wastes of chlorine and alkali which are hazardous for the vegetable and animal kingdoms. These wastes practically cannot be destroyed or utilized, and this fact makes the chloro-hydrine method unsuitable for the development of production of propylene oxide on an industrial scale. Attempts have been made in some countries to produce propylene oxide by catalytic epoxidation of propylene with the hydroperoxide of ethyl benzene.

This method results in a low yield of propylene oxide, namely, 10–15 kg/m$^3$ per hour. The process is also disadvantageous in that it is effected in three subsequent stages, each requiring special conditions and different catalysts. This hinders the provision of a continuous process and also control thereof. In addition, in this process production of 1 ton of propylene oxide is associated with production of 3 tons of a styrene by-product.

Known also in the art is a promising industrial method based on the simultaneous oxidation of liquid propylene and acetaldehyde with air at a temperature of 70° C and under a pressure of 50 atm. The process is effected in a single stage and is featured by simple technology. However, the yield of propylene oxide is equal to 360 kg per ton of the reacted acetaldehyde, which corresponds to 30 percent of the theoretical yield. In the process of simultaneous oxidation, up to 25 percent of the initial acetaldehyde is converted into carbon dioxide. Furthermore, a considerable amount of explosion-hazardous peroxide compounds is accumulated in the reaction mixture.

A specific object of the subject invention is to provide a method for simultaneously oxidizing olefins and acetaldehyde which makes it possible to increase the rate of oxidation, the yield of olefin oxides for the reacted aldehyde used and the concentration of olefin oxides in the reaction mixture, as well as eliminating the formation of carbon dioxide and reducing the concentration of explosive peroxide compounds.

This and other objects are attained in a method for the simultaneous production of olefin oxides and acetic acid by concurrently oxidizing olefins and acetaldehyde with an oxygen-containing gas at a temperature of 40–150° C and under a pressure of 50 atm in the presence of a catalyst, consisting of silver compounds or vanadium oxides. The silver compounds may be employed either in the form of silver salts, for example AgNO$_3$, AgCl, AgJ, AgBr, or in the form of silver oxides. Air, as the most inexpensive raw material, is preferably used as an oxygen-containing gas. Other oxygen-containing gases may be used, such as nitrogen-oxygen mixtures containing at least 10 percent of oxygen.

In practice the process is carried out as follows. The initial reagent - olefins, for example propylene and acetaldehyde are dissolved in benzene and charged into a metal autoclave along with a quantity of catalyst which is usually equal to 1–10 g per litre of the solution.

The reaction is generally effected in the presence of excess olefin. The reactor is hermetically sealed, the pressure is brought up to 50 atm; and the reaction mixture is brought to the desired temperature while agitating it with a mechanical stirrer and applying heat with the heater of the reactor, both of which are switched on. After attaining a desirable temperature, the oxygen-containing gas is bubbled at a rate of 10–12 litres per hour into the reaction mixture (the rate of bubbling is measured with a rheometer). After completing the reaction, the reactor is cooled and the pressure therein is reduced to atmospheric pressure in order to isolate the non-reacted propylene. The maximum concentration of olefin oxide is attained 1 to 3 hours after the beginning of the reaction, depending on the nature and concentration of the catalyst.

The proposed method has substantial advantages as compared with the process of non-catalytic simultaneous oxidation of olefins and acetaldehyde.

Due to the use of the above mentioned catalysts the rate of formation of propylene oxide is increased from 0.3 mole/l·hour to 1.3 mole/l·hour, while the yield of propylene oxide for the reacted acetaldehyde is increased from 360 kg/t to 850 kg/t. The yield of carbon dioxide for the reacted acetaldehyde is reduced from 200 kg/t to 30 kg/t, while the concentration of peroxide compounds in the reaction mixture is reduced by a factor of 10 and does not exceed 0.08 mole/l.

The invention will be better understood from the following description of some particular examples of carrying the invention into effect.

EXAMPLE I

A metal reactor is filled with 40 ml (24 g) of liquid propylene, 5–10–15 ml (4–8–12 g) of acetaldehyde dissolved in 40 ml (35 g) of benzene, 1.0, 5.0 or 10.0 g of catalyst being added per litre of this solution. The apparatus is hermetically sealed, the pressure is brought up to 50 atm, the mixture is heated to a temperature of 70° C, and an oxygen-containing gas is bubbled through the mixture at a rate of 10–12 l/hour with simultaneous mechanical stirring of the mixture. The composition of the reaction mixture is analyzed by the gas-liquid chromatography method with the use of a stationary phase in the form of polyethylene glycol disatearate applied to a carrier (celite) in an amount of 15 percent of the weight of the carrier, as well as by chemical methods (iodometry, alkalimetry). The maximum concentration of propylene oxide with various catalysts is attained 1 to 3 hours after the beginning of the reaction. The concentration and yield of the products at this moment of time after removing the non-reacted propylene are given in Table I.

follows: propylene oxide, 75g; acetic acid, 130 g; and carbon dioxide, 8 g.

Table I

| | Taken | | Obtained | | | | | | |
|---|---|---|---|---|---|---|---|---|---|
| | | | Propylene oxide | | acetic acid | | peroxide compounds, concentration, mole/l | $CO_2$, yield in g per 100 g of aldehyde | Time of reaction and oxidizing gas |
| catalyst | quantity of catalyst, g/l | Acetaldehyde, mole/l | concentration, mole/l | yield g per 100 g of aldehyde | concentration, mole/l | yield g per 100 g of aldehyde | | | |
| without cat. | | 3.56 | 0.20 | 30.0 | 1.10 | 125 | 0.80 | 19.6 | 1 hour; aid |
| $Ag_2O$ | 1.0 | 3.56 | 1.30 | 72.0 | 2.0 | 133 | 0.80 | 3.9 | as oxidizer |
| $Ag_2O$ | 10.0 | 3.56 | 0.81 | 55.0 | 1.60 | 129 | — | — | as oxidizer |
| $Ag_2O$ | 1.0 | 1.78 | 0.47 | 83.0 | 0.78 | 132 | — | 3.0 | oxidizer |
| $Ag_2O$ | 1.0 | 5.34 | 1.47 | 55.5 | 3.40 | 132 | — | — | do. |
| $V_2O_5$ | 5.0 | 3.56 | 0.95 | 55.0 | 2.10 | 124 | 0.09 | 3.6 | 2 hours; air |
| $V_2O_5$ | 10.0 | 3.56 | 0.90 | 49.0 | 1.80 | 102 | 0.06 | 2.5 | air |
| AgJ | 5.0 | 3.56 | 0.80 | 50.0 | 1.70 | 106 | 0.08 | 5.5 | do. |
| $AgNO_3$ | 5.0 | 3.56 | 0.75 | 36.0 | 1.80 | 84 | 0.12 | 6.7 | 3 hours; air |
| AgCl | 5.0 | 3.56 | 0.73 | 40.0 | 1.80 | 100 | 0.10 | 6.0 | air |
| $Ag_2O$ | 1.0 | 3.56 | 1.20 | 70.0 | 1.90 | 123 | 0.07 | 3.6 | 1 hour; mixture of 12% $O_2$ and 88% of $N_2$ |

EXAMPLE 2

A reactor having a volume of 2 litres equipped with a stirrer for stirring a liquid and catalyst mixture present therein is charged with 1 g of $Ag_2O$, and 2 l of benzene containing 20 per cent by weight of acetaldehyde. The reaction mixture is heated to a temperature of 100° C, and air, propylene and acetaldehyde dissolved in benzene are continuously added to the mixture under a pressure of 50 atm. The vapour-phase mixture from the upper portion of the reactor is fed into a cooler and is collected in a special apparatus, where the quantity and composition of the condensate are taken into account. The liquid mixture from the bottom portion of the reactor is taken-off continuously, and samples thereof are analyzed. The yield of the reaction products as calculated for 100 g of the reacted acetaldehyde is as

We claim:
1. A method for the simultaneous production of propylene oxide and acetic acid comprising the steps of concurrently oxidizing a mixture of propylene and acetaldehyde dissolved in benzene with an oxygen-containing gas in the presence of silver oxide catalyst at a temperature of 40°–150° C and a pressure of 50 atm and recovering propylene oxide and acetic acid, said propylene being employed in an amount in excess of said acetaldehyde.
2. A method as defined in claim 1 wherein the oxygen-containing gas is air.
3. A method as defined in claim 1 wherein the catalyst is employed in an amount in a range of 1 to 10 grams per liter of solution.

* * * * *